Patented Dec. 9, 1952

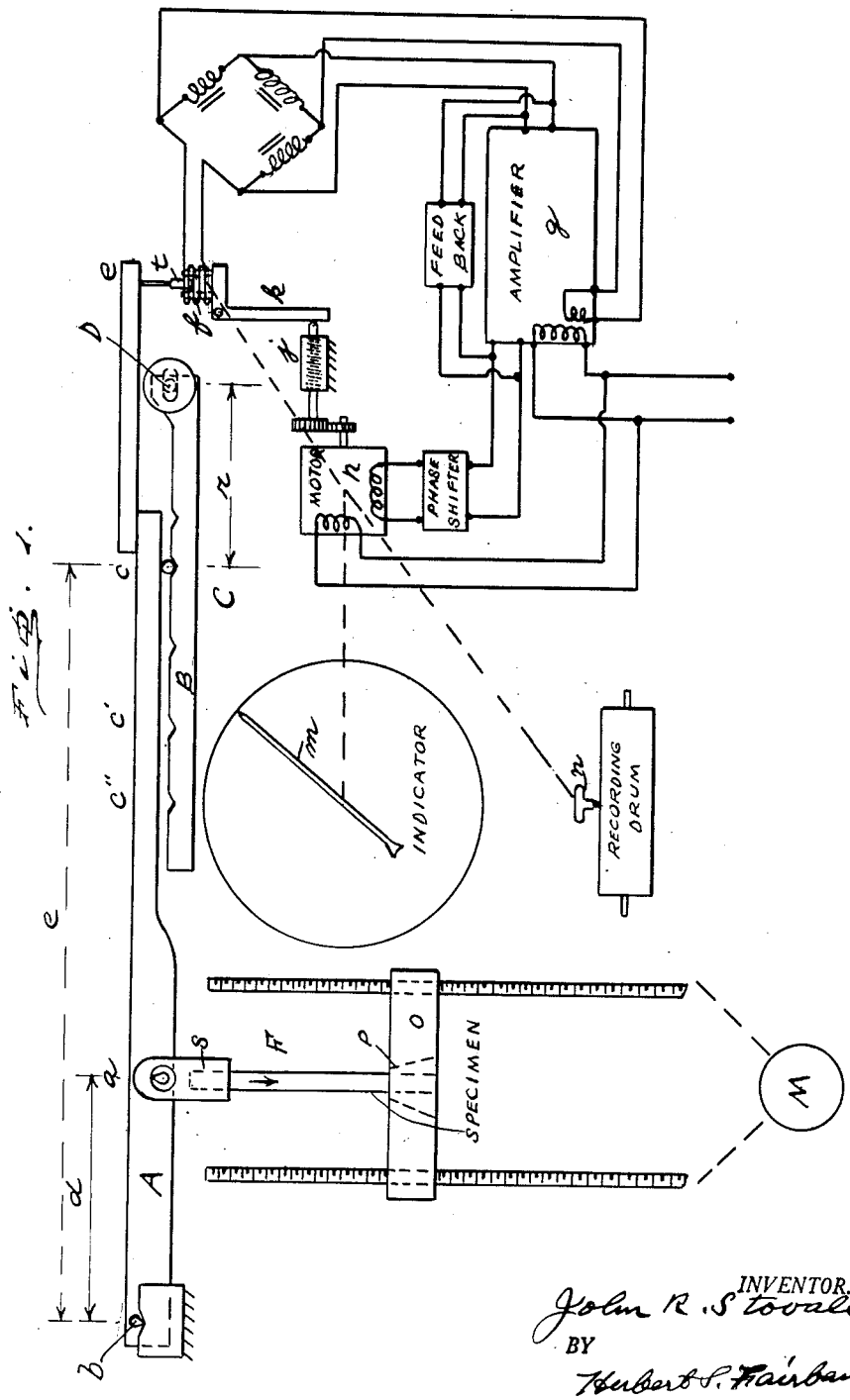

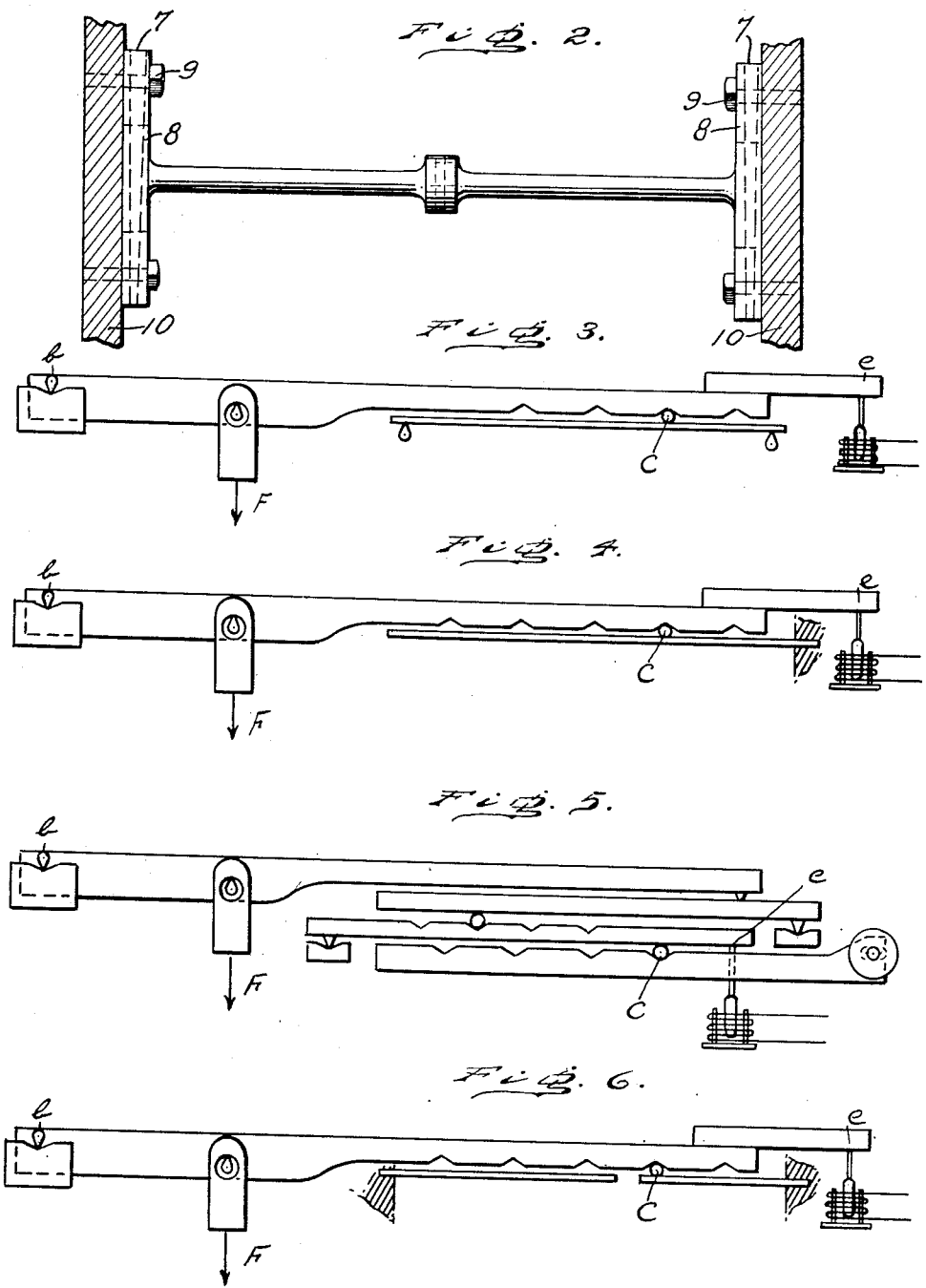

2,620,657

UNITED STATES PATENT OFFICE 2,620,657

FORCE MEASURING APPARATUS

John R. Stovall, Jr., Philadelphia, Pa., assignor to Tinius Olsen Testing Machine Company, Philadelphia, Pa., a corporation of Pennsylvania Application February 26, 1947, Serial No. 731,075

2 Claims. (Cl. 73—133)

This invention pertains to a force measuring apparatus, wherein an elastic member is deformed within its elastic limits, and means are used to measure the deformation as an indication of pressure or load. For example, in testing the physical properties of various materials, or the strength and behavior of structures, a common method is to apply a load or pressure to the specimen or structure and use some device to measure the reaction at the supports as an indication of load independently of the loading system.

The purpose of this invention is to provide a force measuring equipment having certain highly desired characteristics with respect to testing properties, versatility, simplicity of controls, and speed of response, and which, nevertheless is simple and reliable.

In certain applications of weighing, as in the above example, it is often desired that the motion of the weighing member be either zero or extremely small, which is usually difficult of attainment especially for light loads or pressures.

A primary object of the invention is to provide a weighing system with an exceedingly small weighing head motion.

A further object of the invention is to provide a weighing system with very short time constants, i. e. free of time delays or inertia effects such as are present in certain hydraulic or pneumatic systems, or in systems with mass standards.

Further objects of the invention are to provide:

1. A multiplicity of load ranges with a spread larger than the dynamic range of any standard or detector, yet using a single standard and detector.

2. A weighing head motion which is not only very small but is linearly related to load or pressure, and is the same on each of a multiplicity of load ranges.

3. A simple and convenient method of changing ranges, whether using a single standard or a multiplicity of standards.

4. A weighing system which is both simple and of high quality, yet is readily adapted with few changes in parts to any desired range of load.

For the purpose of illustrating the invention, I have shown in the accompanying drawings preferred embodiments of it which I have found in practice to give satisfactory and reliable results. It is, however, to be understood that the various instrumentalities of which the invention consists can be variously arranged and organized, and the invention is not limited to the exact arrangement and organization of these instrumentalities as herein set forth.

Figure 1 is a schematic view of force measuring apparatus, embodying my invention.

Figure 2 is a side elevation of a torsion rod and its mounting.

Figure 3 is a side elevation of a lever system.

Figure 4 is a side elevation of another embodiment of lever system.

Figure 5 is a side elevation of a multiple lever system.

Figure 6 is a side elevation of another form of lever system.

Similar numerals of reference indicate corresponding parts.

Referring to the drawings:

In the measurement of electrical parameters, such as resistance or inductance, the most highly, accurate, available method is the comparison of the parameters to be measured with a high quality standard parameter using a bridge circuit.

The present invention applies this highly accurate comparison method to the measurement of forces.

It is a well known fact that Young's modulus for a material is a definite physical property of a material for a given temperature. Thus, within the elastic limits of a material, this modulus may be used as a standard, and, in conjunction with a measuring device, a convenient weighing system results. If such a system is used, its accuracy depends only on the measuring device used.

The following description uses for illustration a torsion rod elastic standard. It is, however, to be understood that this is only a representative and adaptable type, and that many other shapes and materials may be embodied to use Young's modulus as a standard for the purpose above stated.

Two specific types of alternate systems are shown in Figures 3 and 4. In each of these, as with the torsion standard, the elasticity may be varied from a certain maximum to zero by moving the point of application of the force about on the standard.

For the purpose of describing the working of the invention, a typical system utilizing a torsion rod is shown in Figure 1.

Let a force F be applied to member A at point $a$. Member A is a member fixedly pivoted at $b$ and supported at $c$. Member B is parallel to and directly under member A in such a manner that mechanical contact between A and B may be made at any point along their mutual lengths by laterally interposing rod C between the members so as to keep the tare weight unchanged. The member B acts as a cantilever and is in turn attached to the elastic standard D, a torsion rod, and serves as a torque arm to the torsion rod. The tension rod is secured by keys 7 to bars 8 fixed by fastening devices 9 to a frame 10. If a force F is applied at $a$, a smaller force will act thru $c$ and torque arm B to twist the standard D thru a small angle. Since the member A is fixedly pivoted at $b$, this will produce a small motion at $c$ and a still smaller motion at $a$. The stiffness of the standard D is chosen to give any desired limit to the motion at $a$. The motion at point $e$, rigidly attached to member A, is proportional to the motion at $a$. The member B together with the member D acts as a linear combination of torsion and bending their combination constituting a single elastic member.

Let rod C at point $c$ be now moved to a new point $c'$. For a given standard D, the force F required for a given motion at points $a$ and $e$ will be greatly reduced.

It is apparent that for a given motion at $e$, the twist angle on standard D will be less for contactor C at $c'$ than at C.

Two other effects may be seen, namely, as $r$ is increased:

1. The force F is divided less, and simultaneously
2. The moment radius $r$ is increased.

These two effects make the force F required for a given motion at $e$ decrease much more than proportionally to the changes in $r$. For example, a spread of load ranges of 200 to 1 may be accomplished by a change in $r$ of less than 7 to 1.

A multiplicity of points $c''$, $c'$, $c$, etc., are chosen for a given standard D and a given motion at $e$ to give any desired number of ranges, these points being unique. By proper design of the system, the motion may be made linear with load.

Equations may be set up which, when solved, give the location of the point corresponding to any desired load range in terms of the rod stiffness, inch pounds per radian, the allowed motion at $a$, and the dimensions of the system.

From the foregoing discussion, it is apparent that the motion is linear with load and the same on all load ranges, with a required dynamic range for the standard, in a typical case only one twentieth of the spread of load ranges used.

With C at point $c$ corresponding to a certain load range, as F is increased motion occurs at $e$. This motion may be measured by any suitable form of measuring device. However, the self balancing detector shown has several very important advantages. The magnetic slug plunger $t$ of the detector is attached to member A at $e$, and, as motion occurs, the iron slug in coil $f$ changes the inductance of the coil which is part of an inductance bridge preferably having four equal arms, unbalancing the induction bridge and producing thru a phase adjusted amplifier $g$ a signal of proper phase to run motor $h$ in the desired direction.

The damping required for stability at the desired high sensitivity, wherein a very small motion is amplified for accurate recording and indication on a long scale indicator, is achieved by properly phased and attenuated electrical feedback.

Mechanically connected to the motor shaft thru gears or other suitable connections is a micrometer screw $j$, which, as it is driven by the motor, moves the detector coil itself, either directly or thru a lever reduction $k$ as shown, in the direction required to restore the inductance to its original value. By thus keeping the inductance always constant, the sensitivity of the system remains constant throughout the entire range. This is essential to very high, stable sensitivity. Furthermore, the linearity of the detector is of no consequence.

From the foregoing discussion, it is clear that the linearity and accuracy depends only on the elastic standard D and the screw $j$, while the amplifier $g$ is a passive element and affects only the sensitivity. In the usual application, it is entirely unnecessary to compensate for the temperature effect on the modulus standard, but if desired this may easily be done by enclosing the standard in a box and controlling the temperature in the box by a thermostat.

As the motor drives the micrometer screw to restore the coil, it also drives through gear pulleys or other suitable connections a pointer $m$ or other indicating device, and a recorder pen $n$ or drum.

It will be apparent that by transmitting the force directly, rather than thru an intermediate medium, hydraulic or pneumatic, delays are non-existent.

It will also be apparent that with only one member between the applied force and the standard and this member short and small, and with the total motion of this member very small, the time constant of the system is very low.

While the working of the system has been described with a torsion rod as the standard, this is only one acceptable and convenient method of utilizing the invention. Two alternative systems are shown, using a cantilever beam standard, or a simple, bending beam standard. It is obvious from the foregoing description how these two systems work without detailed description.

Other applications will be apparent.

As used in a material testing machine, one end of the specimen is held by a grip $p$ in a movable crosshead $o$ with the other end in a grip $s$ hung pivotally at point $a$ on the member A. The crosshead $o$ is driven in a conventional manner by motor M and the screws driven thereby. As the specimen is loaded by downward movement of the driven crosshead, the reaction force at $a$ is measured, indicated and recorded automatically in the manner described in detail.

Points along member B are chosen to give any desired number of load ranges. The performance of the system is exactly the same on all load ranges with the maximum motion at $e$ the same on all ranges. This enables the use of a single detector, operable always at optimum and constant sensitivity. Change of the point of contact along B may be done by any of a number of means, manual or automatic, and in conjunction with an indicating system if desired. If done manually, V's may be employed and placed at the desired points and a rod moved from one V to another to change the range, as illustrated in Figure 1.

It will be apparent that, while a simple lever system was illustrated for simplicity of explanation, a compound lever system as shown in Figure 5 can be used. It is usually convenient to locate the moving contact rod arrangement between the last lever of the system and the torque arm, as shown. The motion of some point on the last lever is measured, and the system works exactly as for a simple lever system.

In Figure 6, two or more standards may be used to further extend the spread of load ranges.

While the invention has been described in a concrete form for purpose of proper explanation, it is to be understood that the embodiments shown and described are illustrative only and is not limited thereto, since adaptations and alterations encompassed in the basic principles of the invention and within the scope of the appended claims will readily suggest themselves to persons skilled in this art.

Having thus described the invention, what I claim as new and desire to secure by Letters Patent is:

1. Force measuring apparatus, comprising a rigid lever member pivotally supported to transmit force and motion, an elastic rod fixedly held at each end to act in torsion or combined torsion and bending, a second elongated member rigidly attached at one of its ends to said elastic rod at a point intermediate the ends thereof to serve as a variable arm, said members being axially parallel in overlapping relation, a contact member laterally interposed between said members for selecting a point of contact between them corresponding to a desired reference force, means for measuring the deflection of said first member, and means for indicating and recording this deflection as an indication of force or load applied to said first member.

2. Force measuring apparatus, comprising a multiplicity of levers in a compound lever system, an elastic rod fixedly held at each end to act in combined torsion and bending, an elongated member rigidly attached at one of its ends to said elastic rod at a point intermediate the ends thereof to act as a variable arm, the final lever of said system and said member being axially parallel, in overlapping relation, a contact member laterally interposed between said members for selecting a point of contact between them corresponding to a desired reference force, means for measuring the deflection of said first lever of the system, and means for indicating and recording this deflection as an indication of force or load applied to said first lever of said system.

JOHN R. STOVALL, Jr.

REFERENCES CITED

The following references are of record in the file of this patent:

UNITED STATES PATENTS

| Number | Name | Date |
|---|---|---|
| 1,443,927 | Pruano | Jan. 30, 1923 |
| 1,827,560 | Binckley | Oct. 13, 1931 |
| 2,025,928 | Wunsch | Dec. 31, 1935 |
| 2,046,005 | Sprecker | June 30, 1936 |
| 2,087,885 | Fleischel | July 27, 1937 |
| 2,126,157 | Von Thungen | Aug. 9, 1938 |
| 2,190,506 | Wurr | Feb. 13, 1940 |
| 2,285,892 | Bohannan | June 9, 1942 |